US007954386B2

(12) United States Patent
Nanaji et al.

(10) Patent No.: US 7,954,386 B2
(45) **Date of Patent: *Jun. 7, 2011**

(54) SYSTEM AND METHOD FOR DETECTING PRESSURE VARIATIONS IN FUEL DISPENSERS TO MORE ACCURATELY MEASURE FUEL DELIVERED

(75) Inventors: Seifollah S. Nanaji, Hinsdale, IL (US); Philip A. Robertson, Greensboro, NC (US)

(73) Assignee: Gilbarco Inc., Greensboro, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 12/728,468

(22) Filed: Mar. 22, 2010

(65) Prior Publication Data

US 2010/0172767 A1 Jul. 8, 2010

Related U.S. Application Data

(63) Continuation of application No. 11/737,986, filed on Apr. 20, 2007, now Pat. No. 7,681,460.

(51) Int. Cl.
*G01F 1/00* (2006.01)

(52) U.S. Cl. .......................................................... 73/861

(58) Field of Classification Search .................... 73/861, 73/861.79, 861.75; 137/12
See application file for complete search history.

(56) References Cited

U.S. PATENT DOCUMENTS 3,939,649 A 2/1976 McCabe
3,940,020 A 2/1976 McCrory et al.
4,885,943 A 12/1989 Tootell et al.
4,971,005 A 11/1990 Dyer et al.
4,978,029 A 12/1990 Furrow et al.
5,038,971 A 8/1991 Gayer et al.
5,157,958 A 10/1992 Geisinger
5,390,532 A 2/1995 Anthony
5,447,062 A 9/1995 Köpl et al.
5,673,736 A 10/1997 Farkas
5,689,071 A 11/1997 Ruffner et al.
5,717,564 A 2/1998 Lindale
5,734,851 A 3/1998 Leatherman et al.
5,954,080 A 9/1999 Leatherman
5,956,259 A 9/1999 Hartsell, Jr. et al.
5,992,479 A 11/1999 Simpson
6,052,629 A 4/2000 Leatherman et al.

(Continued)

FOREIGN PATENT DOCUMENTS

JP 2004-257525 9/2004

(Continued)

OTHER PUBLICATIONS

Portions of the file history of U.S. Appl. No. 11/939,345 filed Nov. 13, 2007, which issued as U.S. Patent No. 7,725,271 on May 25, 2010.

(Continued)

*Primary Examiner* — Jewel Thompson

(74) *Attorney, Agent, or Firm* — Nelson Mullins Riley & Scarborough LLP

(57) ABSTRACT

A system and method for compensating a calculated or flow rate of fuel dispensed to a vehicle via a fuel flow path in response to a determination of a non-steady state condition based on data corresponding to a signal transmitted by a pressure sensor operatively coupled to the fuel flow path and configured to sense pressure therein, where the pressure sensor is adapted to transmit a signal representative of the sensed pressure.

31 Claims, 12 Drawing Sheets

U.S. PATENT DOCUMENTS

| | | | |
|---|---|---|---|
| 6,062,629 | A | 5/2000 | Gentile |
| 6,067,476 | A | 5/2000 | Siler |
| 6,098,467 | A | 8/2000 | Wallen |
| 6,148,801 | A | 11/2000 | Wenzlawski |
| 6,157,871 | A | 12/2000 | Terranova |
| 6,213,172 | B1 | 4/2001 | Dickson |
| 6,227,227 | B1 | 5/2001 | Poleshuk et al. |
| 6,302,165 | B1 | 10/2001 | Nanaji et al. |
| 6,347,649 | B1 | 2/2002 | Pope et al. |
| 6,363,299 | B1 | 3/2002 | Hartsell, Jr. |
| 6,374,870 | B1 | 4/2002 | Muller |
| 6,375,434 | B1 | 4/2002 | Taivalkoski et al. |
| 6,381,514 | B1 | 4/2002 | Hartsell, Jr. |
| 6,418,981 | B1 | 7/2002 | Nitecki et al. |
| 6,421,616 | B1 | 7/2002 | Dickson |
| 6,435,204 | B2 | 8/2002 | White et al. |
| 6,438,452 | B1 | 8/2002 | Dickson |
| 6,446,049 | B1 | 9/2002 | Janning et al. |
| 6,463,389 | B1 | 10/2002 | Dickson |
| 6,522,947 | B1 | 2/2003 | Hartsell, Jr. |
| 6,532,999 | B2 | 3/2003 | Pope et al. |
| 6,542,832 | B1 | 4/2003 | LaMothe |
| 6,575,206 | B2 | 6/2003 | Struthers et al. |
| 6,629,455 | B2 | 10/2003 | Schrittenlacher et al. |
| 6,712,084 | B2 | 3/2004 | Shajii et al. |
| 6,721,669 | B2 | 4/2004 | Köpl et al. |
| 6,745,104 | B1 | 6/2004 | Dickson |
| 6,854,342 | B2 | 2/2005 | Payne et al. |
| 6,932,098 | B2 | 8/2005 | Shajii et al. |
| 6,935,191 | B2 | 8/2005 | Olivier et al. |
| 7,010,961 | B2 | 3/2006 | Hutchinson et al. |
| 7,028,561 | B2 | 4/2006 | Robertson et al. |
| 7,048,964 | B2 | 5/2006 | McGlinchy et al. |
| 7,073,392 | B2 | 7/2006 | Lull et al. |
| 7,076,330 | B1 | 7/2006 | Dickson |
| 7,111,520 | B2 | 9/2006 | Payne et al. |
| 7,152,004 | B2 | 12/2006 | Reichler et al. |
| 7,273,063 | B2 | 9/2007 | Lull et al. |
| 7,429,299 | B2 | 9/2008 | McGlinchy et al. |
| 7,497,083 | B2 | 3/2009 | Yates et al. |
| 7,681,460 | B2 * | 3/2010 | Nanaji et al. .................... 73/861 |
| 7,689,371 | B2 | 3/2010 | Memmott et al. |
| 7,725,271 | B2 | 5/2010 | Yang et al. |
| 2001/0004909 | A | 1/2001 | Pope et al. |
| 2003/0114946 | A1 | 6/2003 | Kitchen |
| 2005/0056340 | A1 | 3/2005 | Walker et al. |
| 2005/0080589 | A1 | 4/2005 | Tiberi |
| 2007/0128050 | A1 | 6/2007 | Cedrone et al. |
| 2008/0033901 | A1 | 2/2008 | Wargo et al. |
| 2009/0293989 | A1 | 12/2009 | Yang et al. |

FOREIGN PATENT DOCUMENTS

| | | |
|---|---|---|
| JP | 2004-257526 | 9/2004 |

OTHER PUBLICATIONS

Portions of the file history of U.S. Appl. No. 12/131,219 filed Jun. 2, 2008, which published as U.S. published application No. 2009/0293989 on Dec. 3, 2009.

International Search Report and Written Opinion of the International Searching Authority mailed on Aug. 14, 2008 for International patent application No. PCT/US2008/004696 filed Apr. 10, 2008 corresponding to U.S. Appl. No. 11/737,986 filed Apr. 20, 2007, which issued as U.S. Patent No. 7,681,460 on Mar. 23, 2010.

International Search Report and Written Opinion of the International Searching Authority mailed on Jan. 6, 2009 for International patent application No. PCT/US2008/083103 filed on Nov. 11, 2008 corresponding to U.S. Appl. No. 11/939,345 filed Nov. 11, 2007, which issued as U.S. Patent No. 7,725,271 on May 25, 2010.

International Search Report of the International Searching Authority mailed on Jul. 2, 2009 for International patent application No. PCT/US2009/043609 filed on May 12, 2009 corresponding to U.S. Appl. No. 12/131,219 filed Jun. 2, 2008, which published as U.S. published patent application No. 2009/0293989 on Dec. 3, 2009.

Office Action issued by the U.S. Patent and Trademark Office on Jan. 26, 2011 for copending U.S. Appl. No. 12/131,219 filed on Jun. 2, 2008.

* cited by examiner

SYSTEM AND METHOD FOR DETECTING PRESSURE VARIATIONS IN FUEL DISPENSERS TO MORE ACCURATELY MEASURE FUEL DELIVERED

CLAIM OF PRIORITY

This application is a continuation of U.S. patent application Ser. No. 11/737,986, filed Apr. 20, 2007, the entire disclosure of which is incorporated by reference herein.

FIELD OF THE INVENTION

The present invention relates to detecting pressure variations, including pressure spikes, in fuel dispensers to reduce and/or eliminate fuel measurement inaccuracies that result from such pressure variations.

BACKGROUND OF THE INVENTION

In a typical fueling transaction, a customer drives a vehicle up to a fuel dispenser in a fueling environment. The customer arranges for payment, either by paying at the pump, paying the cashier with cash, using a credit card or debit card, or some combination of these methods. The nozzle is inserted into the fill neck of the vehicle, and fuel is dispensed into the fuel tank of the vehicle. A display on the fuel dispenser indicates the amount of fuel that has been dispensed during the fueling transaction. The customer relies on the fuel dispenser to measure the amount of fuel dispensed accurately and charge the customer accordingly.

Operating internally within the fuel dispenser are valves that open and close the fuel flow path and a meter that measures the amount of fuel dispensed. The purpose of the meter is to accurately measure the amount of fuel delivered to the customer's vehicle so that the customer may be billed accordingly and fuel inventory updated. For pre-pay transactions, the fuel dispenser also relies on the meter to measure the fuel dispensed so as to control the termination of fuel dispensing.

Fuel dispenser meters may be positive displacement or inferential meters. Positive displacement meters measure the actual displacement of the fuel, while inferential meters determine fuel flow indirectly using a device responsive to fuel flow. In other words, inferential meters do not measure the actual volumetric displacement of the fuel. Inferential meters have some advantages over positive displacement meters. Chief among these advantages is that inferential meters may be provided in smaller packages than positive displacement meters. With either positive displacement or inferential meters, the meter generates a meter signal that is responsive to the amount of fuel flowing in the fuel flow path. The meter communicates the meter signal to a control system in the fuel dispenser.

One example of an inferential meter is described in U.S. Pat. No. 5,689,071, entitled "WIDE RANGE, HIGH ACCURACY FLOW METER." The '071 patent describes a turbine flow meter that measures the flow rate of a fluid by analyzing rotations of turbine rotors located inside the fuel flow path of the meter. As fluid enters the inlet port of the turbine flow meter in the '071 patent, the fluid passes across two turbine rotors, which causes the turbine rotors to rotate. The rotational velocity of the turbine rotors is sensed by pick-off coils. The pick-off coils are excited by an alternating current signal that produces a magnetic field. As the turbine rotors rotate, the vanes on the turbine rotors pass through the magnetic field generated by the pick-off coils, thereby superimposing a pulse on the carrier waveform of the pick-off coils. The superimposed pulses occur at a frequency (pulses per second) proportional to the turbine rotors' rotational velocity and hence proportional to the measured rate of flow. The pulses are sent to a control system as meter signals in the form of pulser signals. The control system receives the meter signals from the meter and converts the meter signals into the fuel flow rate and the volume of fuel dispensed.

A problem may occur with accurately measuring fuel flow when a customer is fueling his or her automobile at a retail fuel dispenser. If a non-steady state condition occurs, for example, by the costumer closing and opening the fuel nozzle in a rapid fashion, known as a "nozzle snap," inaccuracy in fuel measured by the meter is introduced. The nozzle snap creates a pressure shock wave that causes a flow disturbance at the meter resulting in a false flow indication. If a flow switch is employed to detect when flow stops, the pressure shock wave causes the flow switch to bounce. The control system that receives the meter signals from the meter registers fuel flow without taking into account the flow disturbance. The cumulative effect of the nozzle snaps and the flow switch bouncing, if present, results in meter measurement inaccuracies. Meter measurement inaccuracies may cause the fuel dispenser displays to register false fuel flow rate and fuel volume dispensed, and may cause the accuracy to be outside of allowable limits.

Therefore, a need exists for a fuel dispenser to accurately measure fuel flow with a meter even during a nozzle snap or other non-steady state condition.

SUMMARY OF THE INVENTION

The present invention is a system and method for enhancing the accuracy of fuel flow measurement by detecting and compensating for pressure variations, such as pressure spikes or shock waves, created by a nozzle snap or other non-steady state condition. The pressure variations may cause flow disturbances, including, for example, unsteady flow or transient flow, which in turn may introduce meter measurement inaccuracies. Pressure variations can be "seen" locally at a fuel dispenser as a result of nozzle snaps, or remotely as a result of a remote nozzle snap occurring at another fuel dispenser.

In one embodiment, a metered fuel line pressure sensor is positioned downstream from a meter in a metered fuel line of a fuel dispenser. The metered fuel line pressure sensor is connected to a control system in the fuel dispenser and sends a metered fuel line pressure signal to the control system. If the pressure in the metered fuel line incurs a variation or surge, such as a pressure spike, the metered fuel line pressure sensor senses the pressure variation and sends a metered fuel line pressure signal reflecting the pressure variation to the control system. The control system receives and recognizes the metered fuel line pressure signal as a pressure variation in the metered fuel line. The control system determines that the pressure variation was caused by a nozzle snap based on rapid increase and decrease of pressure or other criteria compensates for the pressure variation by disregarding the meter signals and not converting the meter signals from the meter for a predetermined amount of time to allow the pressure in the metered fuel line to return to a pressure indicative of normal steady state fuel flow. Once the predetermined time has expired, the control system resumes converting the meter signals.

In another embodiment of the present invention, a metered fuel line pressure sensor is positioned downstream from a meter in a metered fuel line of a fuel dispenser. An inlet manifold pressure sensor is positioned in an inlet manifold of the fuel dispenser. The metered fuel line pressure sensor and the inlet manifold pressure sensor are connected to a control system of the fuel dispenser and send a metered fuel line pressure signal and an inlet manifold pressure signal, respectively, to the control system. If the pressure in the metered fuel line incurs a variation or surge, the metered fuel line pressure sensor sends a metered fuel line pressure signal to the control system reflecting the pressure variation in the metered fuel line. Similarly, if the pressure in the inlet manifold spikes, the inlet manifold pressure sensor sends an inlet manifold pressure signal to the control system reflecting the pressure variation in the inlet manifold.

The control system receives and recognizes the metered fuel line pressure signal as a pressure variation, such as a pressure spike, in the metered fuel line and receives and recognizes the inlet manifold pressure signal as a pressure variation in the inlet manifold. Because pressure spikes occurred in both the metered fuel line and the inlet manifold, the control system determines that the pressure variations were caused by a remote nozzle snap. A remote nozzle snap is a nozzle snap that occurs at some point in the fueling environment other than at the fuel dispenser. For example, a nozzle snap may be occurring at a different fuel dispenser in the fueling environment. The control system compensates for the pressure variations by disregarding the meter signals and not converting the meter signals from the meter for a predetermined amount of time to allow the pressure in the metered fuel line and the inlet manifold to return to a pressure indicative of normal steady state fuel flow. Once the predetermined time has expired, the control system resumes converting the meter signals.

In yet another embodiment of the present invention, a metered fuel line pressure sensor is positioned downstream from a meter in a metered fuel line of a fuel dispenser. A fuel supply line pressure sensor is positioned upstream from the meter in the fuel supply line of the fuel dispenser. The metered fuel line pressure sensor and the fuel supply line pressure sensor send a metered fuel line pressure signal and a fuel supply line pressure signal, respectively, to a control system of the fuel dispenser. If the metered fuel line pressure signal is less than the fuel supply line pressure signal, the control system determines that fuel is flowing in the proper direction through the meter and converts the meter signals from the meter. If the metered fuel line pressure signal is equal to or greater than the fuel supply line pressure signal, the control system determines that the fuel is not flowing or is flowing in a reverse direction and stops converting the meter signals from the meter. The control system resumes converting the meter signals from the meter when the metered line pressure signal becomes less than the fuel supply line pressure signal indicating normal steady state fuel flow.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
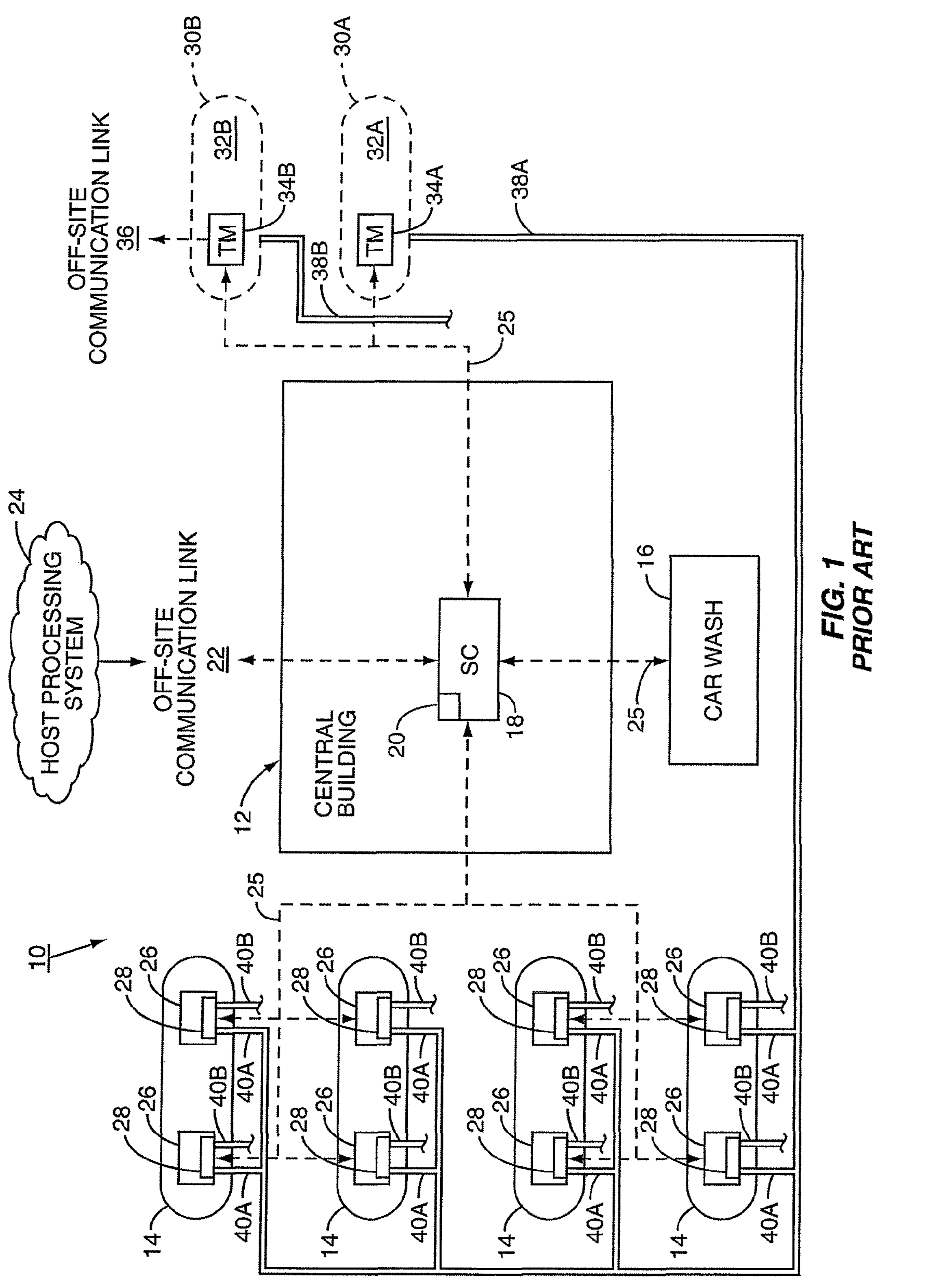
FIG. 1 PRIOR ART
FIG. 1 is a schematic diagram of a fueling environment of a retail service station in the prior art.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a system and method for enhancing the accuracy of fuel flow measurement by detecting and compensating for pressure variations, such as pressure spikes or shock waves, created by a nozzle snap or other non-steady state condition. The pressure variations may cause flow disturbances, which in turn may introduce meter measurement inaccuracies. Pressure variations can be "seen" locally at a fuel dispenser as a result of nozzle snaps, or remotely as a result of a remote nozzle snap occurring at another fuel dispenser. For certain types of meters used in fuel dispensers, the meter may continue to send to the control system meter signals indicating fuel flow even though flow disturbances are introduced in the fuel flow path interrupting the fuel flow and/or causing the fuel to flow in the reverse direction. The flow disturbances may be due to pressure waves or pulses created by a non-steady state condition. The non-steady state condition may be caused by a nozzle snap. The flow disturbances result in meter inaccuracies. In addition, a flow switch may be incorporated in the fuel flow path to detect when fuel flow stops. The pressure waves or pulses will cause the flow switch to bounce, sending false flow signals to the control system. The cumulative effect of the meter measurement inaccuracies and the flow switch bouncing causes the fuel dispenser displays to register false fuel flow rate and fuel volume dispensed. This effect is described in U.S. Pat. No. 6,935,191, entitled "FUEL DISPENSER FUEL FLOW METER DEVICE, SYSTEM AND METHOD," which is hereby incorporated by reference in its entirety.

The present invention is directed to compensating the fuel volume measurement of fuel dispensed by a fuel dispenser based on pressure variations, such as pressure spikes, detected in the fuel flow path of the fuel dispenser. Pressure sensors detect pressure in the fuel flow path of a fuel dispenser and communicate pressure signals reflecting the pressure sensed to a control system of the fuel dispenser. Based on the pressure signals, the control system determines whether there is a non-steady state condition in the fuel flow path, such as one caused by a nozzle snap. If the control system determines that there was such a non-steady state condition, the control system stops converting meter signals from the meter into fuel flow rate and fuel volume dispensed signals for a predetermined period of time to allow the pressure in the fuel flow path to return to a level indicative of normal, steady state fuel flow. Alternatively, the control system may mathematically adjust the conversion calculation to compensate for the non-steady state period. After expiration of the predetermined period of time, the control system resumes converting the meter signals in a normal manner.

This patent application references pressure variations as including pressure spikes, pressure surges, and/or pressure shock waves. Each of these terms are used interchangeably to express a pressure variation indicative of flow disturbances, for example, unsteady flow or transient flow. Each of one term versus another is not meant to limit the invention or its application beyond pressure variations in any manner.

In the main embodiment of the present invention, a turbine flow meter is described as the meter of the fuel dispenser. The turbine flow meter may be one as described in U.S. Pat. No. 5,689,071, entitled "WIDE RANGE, HIGH ACCURACY FLOW METER," which is hereby incorporated by reference in its entirety. Note, however, that the present invention can be practiced with any type of meter including a positive displacement meter. Before discussing the particular aspects of the present invention, a brief description of a fueling environment is provided.

FIG. 1 illustrates a conventional exemplary fueling environment 10. Such a fueling environment 10 may comprise a central building 12, a plurality of fueling islands 14, and a car wash 16, for example. The central building 12 need not be centrally located within the fueling environment 10, but rather is the focus of the fueling environment 10 and may house a controller 18, which may be a site controller (SC) 18, which in an exemplary embodiment may be the G-SITE® sold by Gilbarco Inc. of Greensboro, N.C. The site controller 18 may include a memory 20 and may control the authorization of fueling transactions and other conventional activities as is well understood.

Further, the site controller 18 may have an off-site communication link 22 allowing communication with a remote host processing system 24 for content provision, reporting purposes, or the like, as needed or desired. The off site communication link 22 may be routed through the Public Switched Telephone Network (PSTN), the Internet, both, or the like, as needed or desired.

The car wash 16 may have a point of sale (not shown) associated therewith that communicates via an on-site communication link 25 with the site controller 18 for inventory and/or sales purposes. The on-site communication link 25 may be a Local Area Network (LAN), pump communication loop, other communication channel or line, or the like. The car wash 16 alternatively may be an optional stand alone unit and need not be present in a given fueling environment.

The fueling islands 14 may have one or more pumps or fuel dispensers 26 positioned thereon. The fuel dispensers 26 may be, for example, the ECLIPSE® or ENCORE® fuel dispenser sold by Gilbarco Inc. of Greensboro, N.C. The fuel dispensers 26 are in electronic communication with the site controller 18 via the on-site communication link 25.

The fueling environment 10 also has one or more underground storage tanks (UST) 30A, 30B adapted to hold fuel 32A, 32B therein. One underground storage tank 30A, for example, may store high octane fuel 32A, while the other underground storage tank 30B may store low octane fuel 32B. The underground storage tanks 30A, 30B may be double-walled tanks. Further, each underground storage tank 30A, 30B may include a liquid level sensor or other sensor (not shown) positioned therein. The sensors may report to a tank monitor (TM) 34A, 34B associated therewith. The tank monitor 34 may communicate with the fuel dispensers 26 via the on-site communication link 25, either through the site controller 18 or directly, as needed or desired, to determine amounts of fuel 32 dispensed, and compare fuel 32 dispensed to current levels of fuel 32 within the underground storage tanks 30 to determine if the underground storage tanks 30 are leaking. Although not shown in FIG. 1, the tank monitor 34 may also be positioned in the central building 12, and may be located near the site controller 18.

Fuel 32 flows from the underground storage tanks 30 to the fuel dispensers 26 via an underground fuel delivery system comprising main fuel line, piping or conduit 38A, 38B and branch fuel line, piping or conduit 40A, 40B. The branch fuel line 40 allows fuel 32 to flow from the main fuel line 38, through other flow components (shown on FIG. 4) to a meter 28 located in each fuel dispenser 26. An exemplary underground fuel delivery system is illustrated in U.S. Pat. No. 6,435,204, entitled "FUEL DISPENSING SYSTEM," which is hereby incorporated by reference in its entirety.

The tank monitor 34 may communicate with the site controller 18 and further may have an off-site communication link 36 for leak detection reporting, inventory reporting, or the like. Much like the off-site communication link 22, the off-site communication link 36 may be through the PSTN, the Internet, both, other communication line, or the like. If the off-site communication link 22 is present, the off-site communication link 36 need not be present and vice versa, although both links may be present if needed or desired. As used herein, the tank monitor 34 and the site controller 18 are site communicators to the extent that they allow off-site communication and report site data to a remote location.

For further information on how elements of a fueling environment 10 may interact, reference is made to U.S. Pat. No. 5,956,259, entitled "INTELLIGENT FUELING," which is hereby incorporated by reference in its entirety. Information about fuel dispensers may be found in commonly owned U.S. Pat. No. 5,734,851, entitled "MULTIMEDIA VIDEO/GRAPHICS IN FUEL DISPENSERS" and U.S. Pat. No. 6,052,629, entitled "INTERNET CAPABLE BROWSER DISPENSER ARCHITECTURE," which are hereby incorporated by reference in their entireties. An exemplary tank monitor 34 is the TLS-350R manufactured and sold by Veeder-Root Company of Simsbury, Conn.

Figure 2:
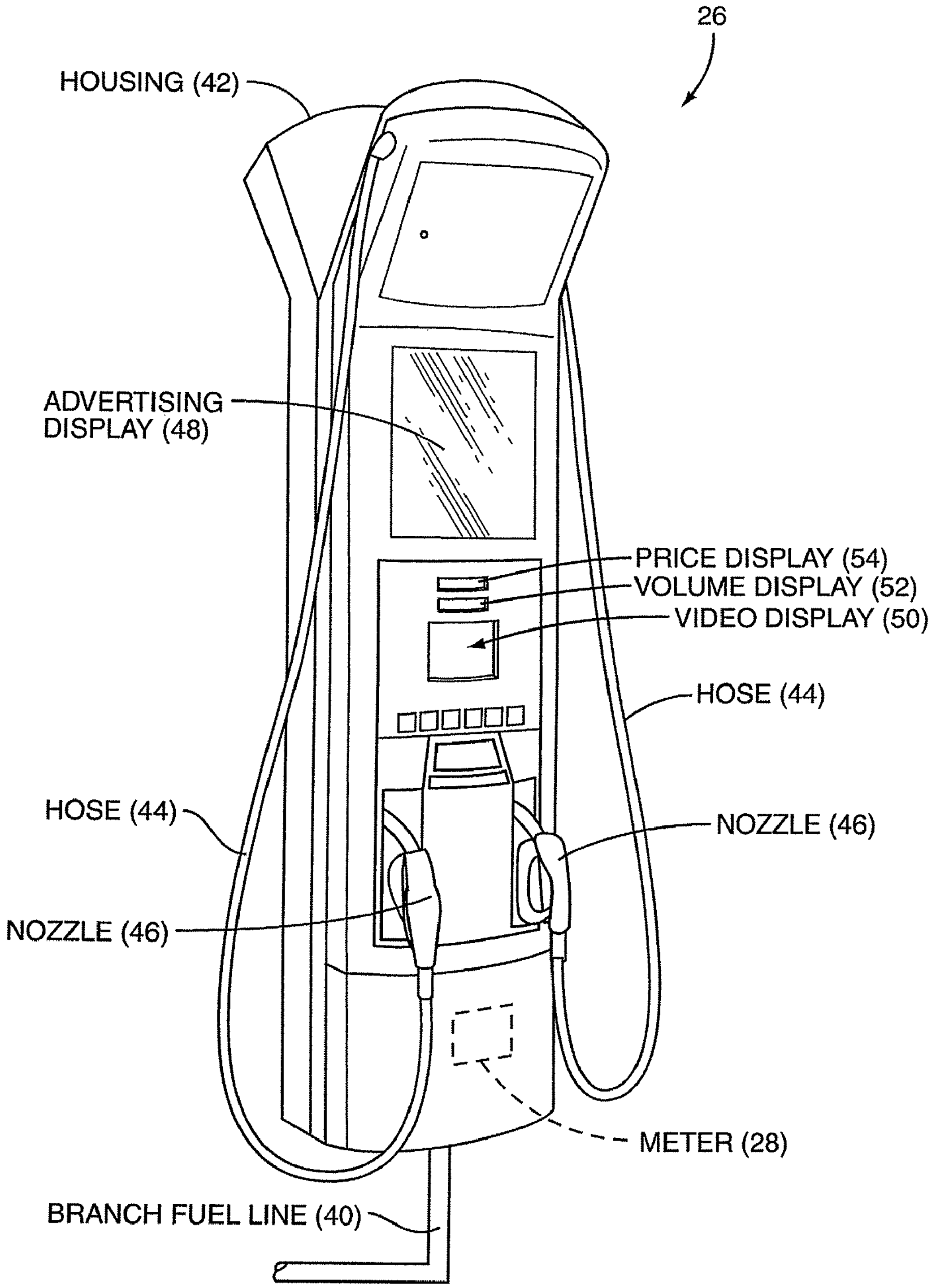
FIG. 2 PRIOR ART
FIG. 2 illustrates a partial front view of a fuel dispenser in the prior art.

The front of a fuel dispenser 26 of the prior art is illustrated in FIG. 2. The fuel dispenser 26 includes a housing 42 and may have an advertising display 48 proximate the top of the housing 42 and a video display 50 at eye level. The video display 50 may be the Infoscreen® manufactured and sold by Gilbarco Inc. The video display 50 may be associated with auxiliary information displays relating to an ongoing fueling transaction that includes the number of gallons of fuel dispensed displayed on a volume display 52, and the price of such fuel dispensed on a price display 54. The displays 48, 50, 52 and 54 may include the capability of displaying streaming video and further may include liquid crystal displays (LCDs) as needed or desired. The branch fuel line 40 enters the fuel dispenser 26 through the bottom of the fuel dispenser 26. The meter 28 and other flow components (not shown) are mounted within the housing 42 of the fuel dispenser 26. The fuel 32 is eventually delivered into a fuel tank of a vehicle (not illustrated) via a hose 44 and a nozzle 46.

In most fuel dispensers 26, a submersible turbine pump (STP) (not illustrated) associated with the UST is used to pump fuel to the fuel dispenser 26. Some fuel dispensers 26 may be self-contained, meaning fuel is drawn to the fuel dispenser 26 by a pump controlled by a motor (neither shown) positioned within the housing 42. The meter 28 and other fuel flow components of the fuel dispenser 26 are located in a different compartment from the electronic components and separated by a vapor barrier (not shown) as is well understood and as is described in U.S. Pat. No. 5,717,564, entitled "FUEL PUMP WIRING," which is hereby incorporated by reference in its entirety. Accordingly, the fuel flow path extends from the underground storage tanks 30 to the nozzle 46 where it is dispensed into the fuel tank of a vehicle.

Figure 3:
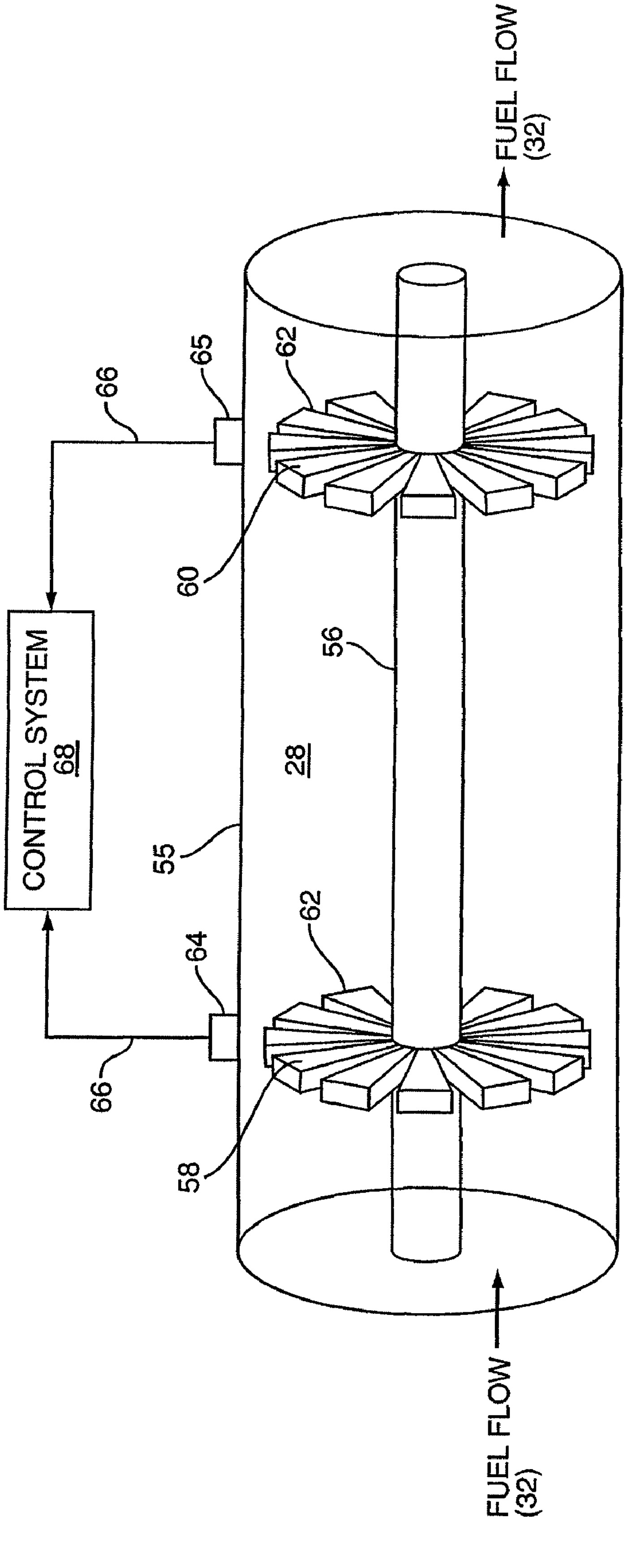
FIG. 3 PRIOR ART
FIG. 3 illustrates a schematic diagram of a turbine flow meter of the prior art that may be used as the meter in one embodiment of the present invention.

FIG. 3 illustrates one particular type of meter 28 in the prior art that may be used in the present invention. This meter 28 is a turbine flow meter 28. An example of a turbine flow meter 28 is described in U.S. Pat. No. 5,689,071 entitled "WIDE RANGE HIGH ACCURACY FLOW METER" previously referenced in the background of the invention above. The turbine flow meter 28 is comprised of a meter housing 55 that is typically constructed out of a high permeable material such as monel, a nickel-copper alloy, stainless steel, or 300-series non-magnetic stainless steel, for example. The meter housing 55 forms a cylindrical hollow shape that forms an inlet and outlet for fuel 32 to flow through the turbine flow meter 28. A shaft 56 is placed internal to the meter housing 55 to support one or more turbine rotors 58, 60. In the present example, two turbine rotors are illustrated; a first turbine rotor 58, and a second turbine rotor 60, but only one turbine rotor 58 may be used as well.

The turbine rotors 58, 60 rotate in an axis perpendicular to the axis of the shaft 56. The turbine rotors 58, 60 contain one or more vanes 62, also known as blades. As fuel 32 passes through the inlet of the turbine flow meter 28 and across the vanes 62 of the turbine rotors 58, 60, the turbine rotors 58, 60 and the vanes 62 rotate at a velocity proportional to the rate of flow of the fuel 32 flowing through the turbine flow meter 28. The proportion of the rotational velocity of the first turbine rotor 58 to the second turbine rotor 60 is determined by counting the vanes 62 passing by the pickoff coils 64, 65. The rotational velocity of the turbine rotors 58, 60 can be used to determine the flow rate of fuel 32 passing through the turbine flow meter 28, as is described in the aforementioned U.S. Pat. No. 5,689,071.

In the present example, there are two pickoff coils—a first pickoff coil 64 placed proximate to the first turbine rotor 58, and a second pickoff coil 65 placed proximate to the second turbine rotor 60. It is noted that the turbine flow meter 28 can be provided with only one turbine rotor 58 to detect flow rate as well. Also, the meter housing 55 may be comprised of two different permeable materials such as described in U.S. Pat. No. 6,854,342 entitled "INCREASED SENSITIVITY FOR TURBINE FLOW METER," which is incorporated herein by reference in its entirety.

The pickoff coils 64, 65 generate a magnetic signal that penetrates through the permeable meter housing 55 to reach the vanes 62. As the turbine rotors 58, 60 rotate, the vanes 62 superimpose a meter signal 66 in the form of a pulser signal on the magnetic signal generated by the pickoff coils 64, 65. The meter signal 66 is analyzed by a control system 68 to determine the velocity of the vanes 62 that in turn can be used to calculate the flow rate and/or volume of fuel 32 flowing through the turbine flow meter 28.

Flow disturbances created by pressure shock waves or pulses may cause unsteady flow or transient flow resulting in the fuel flow rate varying faster or slower than the rotation of the turbine rotors 58, 60. Due to the variation of the fuel flow rate, the fuel flow rate may not match the steady state calibration conditions of the meter. In this instance, the turbine rotors 58, 60 continue to rotate and vanes 62 continue to superimpose a signal on the pick-off coils 64, 65, thereby generating the meter signals 66 as if the steady state condition exists. These meter signals 66 are communicated to the control system 68. The control system 68 will use the meter signals 66 to determine the flow rate and/or volume of fuel 32 erroneously since fuel 32 was not flowing through the turbine flow meter 28 in the steady state condition. Accordingly, the control system 68 must have a means to determine an unsteady flow or transient flow of fuel 32 at the turbine flow meter 28 during a time independent of the meter signal 66 or flow switch signal, if a flow switch (not shown on FIG. 3) is present.

Figure 4:
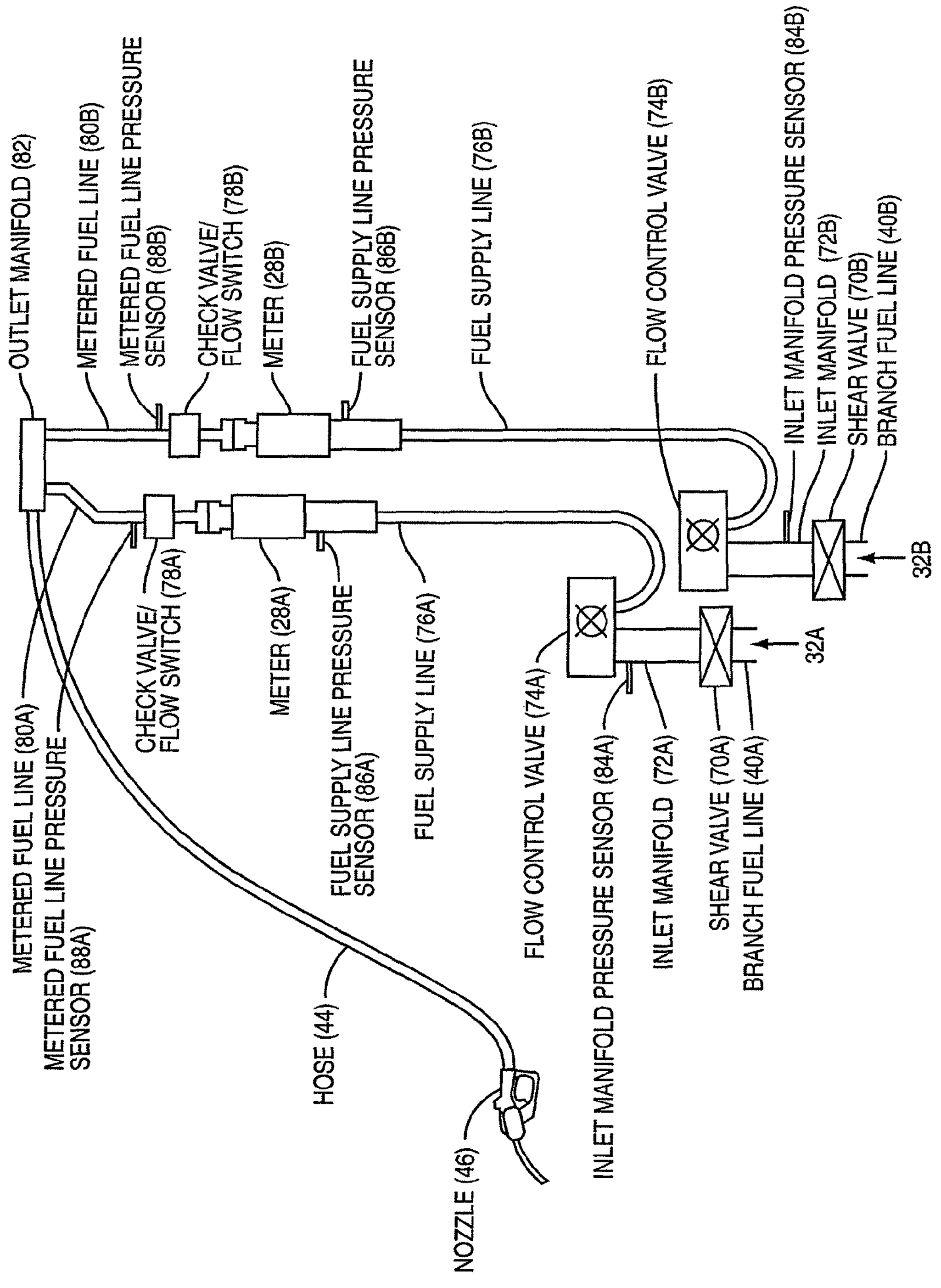
FIG. 4 illustrates a schematic diagram of the fuel flow path and fuel flow components of a fuel dispenser in accordance with one embodiment of the present invention.

FIG. 4 illustrates a schematic diagram of the fuel flow path and fuel flow components of a fuel dispenser 26 in accordance with an embodiment of the present invention. Although not specifically shown in FIG. 4, it is understood that the flow components shown are internal to or extend from the fuel dispenser 26. Also, a dual set of several of the components are shown (A, B) to indicate separate fuel flow paths for high octane fuel 32A and low octane fuel 32B. It should be understood that the flow components for both octane level fuels are the same, and, accordingly, discussion of such flow components will apply to both and will not differentiate between octane level fuels.

The fuel 32 may travel from the UST 30 (not illustrated) to the fuel dispenser 26 via the main fuel line 38 (not illustrated) and branch fuel line 40. The main fuel line 38 and branch fuel line 40 may be double-walled pipe. The branch fuel line 40 may pass into the housing 42 (not illustrated) of the fuel dispenser 26 first through a shear valve 70. The shear valve 70 is designed to cut off fuel flowing through the branch fuel line 40 if the fuel dispenser 26 is impacted, as is commonly known in the industry. One illustration of a shear valve 70 is disclosed in U.S. Pat. No. 6,575,206, entitled "FLOW DISPENSER HAVING AN INTERNAL CATASTROPHIC PROTECTION SYSTEM," which is hereby incorporated by reference in its entirety.

The fuel 32 may flow from the shear valve 70 through an inlet manifold 72 to a flow control valve 74. The control system 68 (not illustrated) directs the flow control valve 74 to open and close when fuel dispensing is desired or not desired. The flow control valve 74 may be a proportional solenoid controlled valve, such as described in U.S. Pat. No. 5,954,080, entitled "GATED PROPORTIONAL FLOW CONTROL VALVE WITH LOW FLOW CONTROL," for example, which is incorporated herein by reference in its entirety. If the control system 68 directs the flow control valve 74 to open to allow fuel 32 to be dispensed, the fuel 32 enters the flow control valve 74 and exits into a fuel supply line 76. The fuel supply line 76 connects the flow control valve 74 with the meter 28.

Fuel 32 flows through the fuel supply line 76 to and through the meter 28. The volumetric flow rate of the fuel 32 is measured by the meter 28 as discussed with respect to FIG. 3 above. After fuel 32 flows through the meter 28, fuel passes through a check valve 78. Alternatively, instead of a check valve 78, the fuel 32 may enter a flow switch 78. After the fuel 32 flows through the check valve/flow switch 78, it flows through a metered fuel line 80 to an outlet manifold 82. The high octane fuel 32A and low octane fuel 32B may be blended in the outlet manifold 82 to produce different octane level fuels 32. The fuel 32 exits the outlet manifold 82 to be delivered to the hose 44 and nozzle 46 for eventual delivery into the fuel tank of a vehicle (not illustrated).

In FIG. 4, pressure sensors 84, 86, 88 are shown which may be positioned in different locations of the fuel flow path in accordance with different embodiments of the present invention. An inlet manifold pressure sensor 84 may be positioned in the inlet manifold 72. A fuel supply line pressure sensor 86 may be positioned in the fuel supply line 76. A metered fuel line pressure sensor 88 may be positioned in the metered fuel line 80. The inlet manifold pressure sensor 84, the fuel supply line pressure sensor 86 and the metered fuel line pressure sensor 88 sense the pressure in the respective locations of the fuel flow path in which each is positioned.

Figure 5:
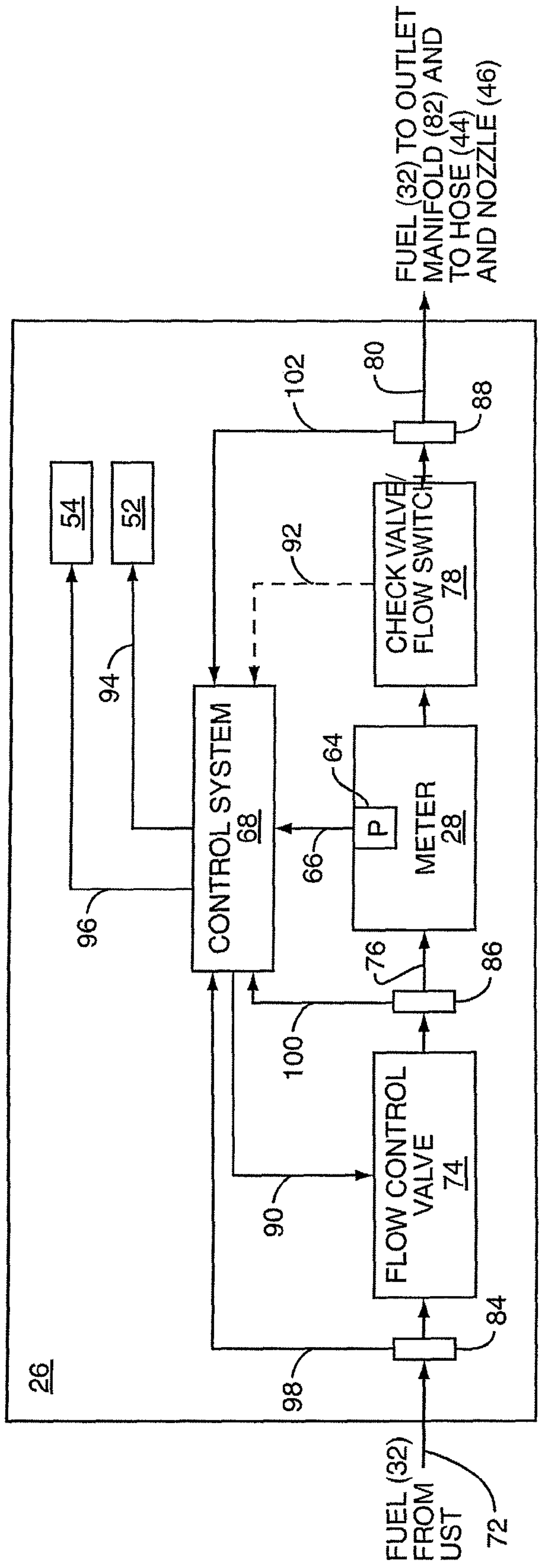
FIG. 5 illustrates a schematic diagram of a fuel dispenser control system, a meter and other fuel flow components in accordance with one embodiment of the present invention.

FIG. 5 illustrates a block diagram of the present invention and of the components that are illustrated in FIG. 4. The control system 68 may be a microcontroller, a microprocessor, or other electronics with associated memory and software programs running thereon as is well understood. The control system 68 directs the flow control valve 74, via a valve communication line 90, to open and close when fuel dispensing is desired or not desired. If the control system 68 directs the flow control valve 74 to open to allow fuel to flow to be dispensed, the fuel enters the flow control valve 74 from the inlet manifold 72 and exits into the fuel supply line 76 and to the meter 28.

The flow rate of the fuel is measured by the meter 28, and the meter 28 communicates the flow rate of the fuel to the control system 68 via a meter signal 66. In this manner, the control system 68 uses the meter signal 66 to determine the volume of fuel flowing through the fuel dispenser and being delivered to a vehicle. The control system 68 updates the total volume in gallons dispensed on the volume display 52 via the volume display communication line 94, and the price of the volume of fuel dispensed on the price display 54 via price display communication line 96.

A flow switch 78, if present, indicates to the control system 68 when fuel is flowing through the meter 28 by a signal 92 in the event the turbine rotors 58, 60 continue to rotate after fueling has stopped. Alternatively, the flow switch 78 may not be present and the fuel dispenser 26 may include just a check valve 78. Fuel exits the flow switch/check valve 78 to the metered fuel line 80 and flows to the outlet manifold 82 (not shown) and then to the hose 44 and nozzle 46. FIG. 5 illustrates that the pickoff coils 64, 65 generate the meter signal 66 to the control system 68. The pickoff coils 64, 65 may be incorporated into the meter 28, or may be external to the meter 28.

Although the control system 68 controls the opening and closing of flow control valve 74 to allow fuel to flow or not flow, the control system 68 cannot guarantee that fuel is flowing through the fuel dispenser 26 just because the control system 68 has directed the flow control valve 74 to be open. If there is a nozzle snap, the rapid closing and opening of the nozzle, or other non-steady state condition in the fueling environment 10, a pressure shock wave is created that causes flow disturbances at the meter 28 resulting in a false flow indication. If a flow switch 78 is present, the pressure shock wave causes the flow switch 78 to bounce also providing an erroneous flow indication to the control system 68. A reverse flow of the fuel 32 may also occur. Even in view of the flow disturbances caused by the pressure shock wave, the control system 68 may continue to receive the meter signals 66 from the pick-off coils 64, 65 of the meter 28 and may continue to register fuel flow as if the steady state condition exists thereby not taking into account the flow disturbances.

Pressure sensors incorporated into the flow path detect pressure shock waves that cause the flow disturbances. The pressure shock waves manifest in the form of pressure spikes. The pressure sensors are connected to the control system 68 and detect the pressure in the fuel flow path. The pressure sensors send pressure signals to the control system 68 including pressure signals that reflect the pressure spike. In FIG. 5, three pressure sensors are shown. The inlet manifold pressure sensor 84 is located and detects pressure in the inlet manifold 72. The fuel supply line pressure sensor 86 is located and detects pressure in the fuel supply line 76. The metered fuel line pressure sensor 88 is located and detects pressure in the metered fuel line 80. The inlet manifold pressure sensor 84 communicates an inlet manifold pressure signal 98 to the control system 68. The fuel supply line pressure sensor 86 communicates a fuel supply line pressure signal 100 to the control system 68. The metered fuel line pressure sensor 88 communicates a metered fuel line pressure signal 102 to the control system 68. The control system 68 may compensate the fuel flow rate and the volume dispensed in response to the pressure signals 98, 100 and 102.

Figure 6A:
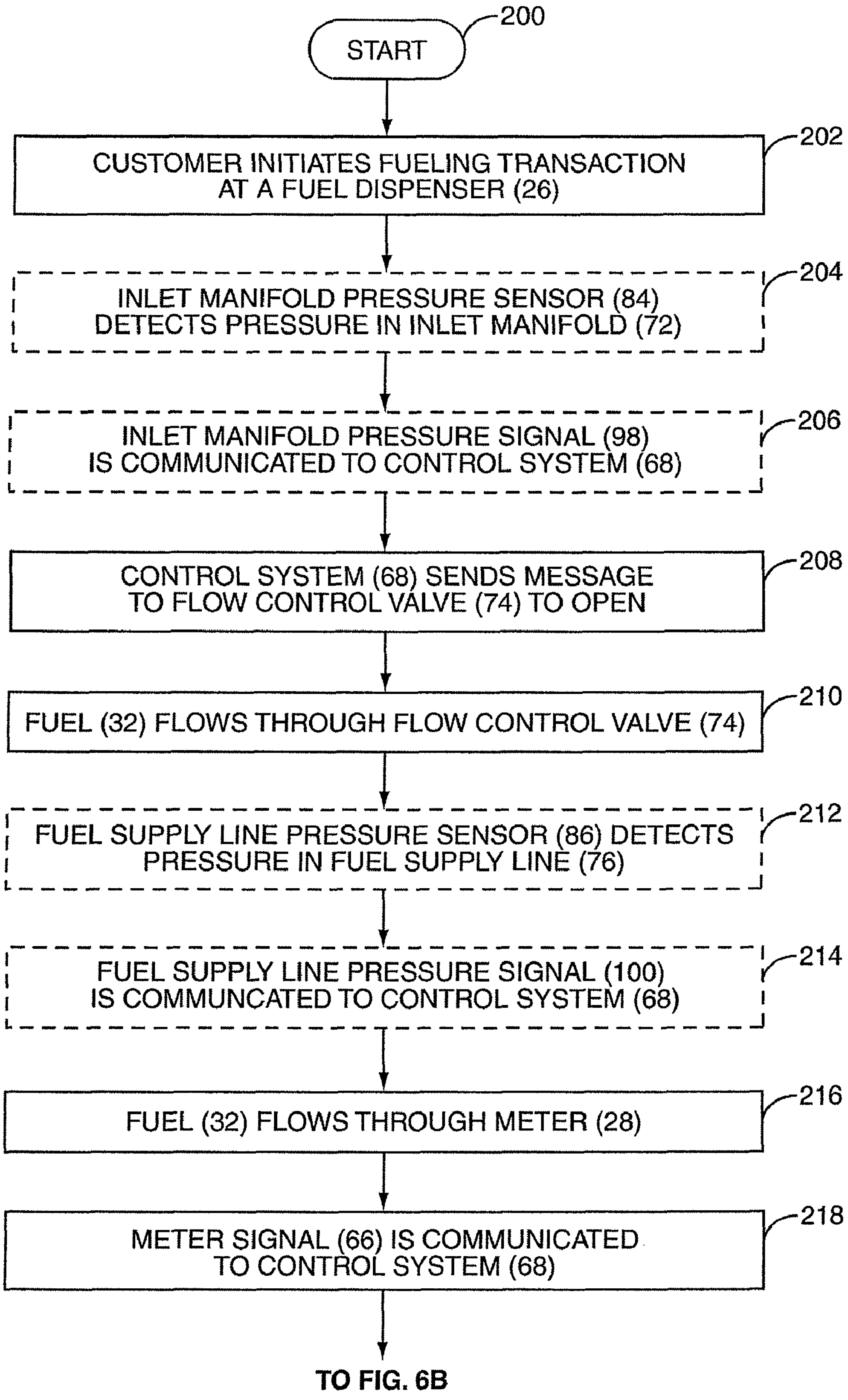
FIGS. 6A and 6B illustrate a flowchart diagram of the operation of a control system of a fuel dispenser to compensate the fuel flow rate and fuel volume dispensed based on received pressure signals in accordance with one embodiment of the present invention.
Figure 6B:
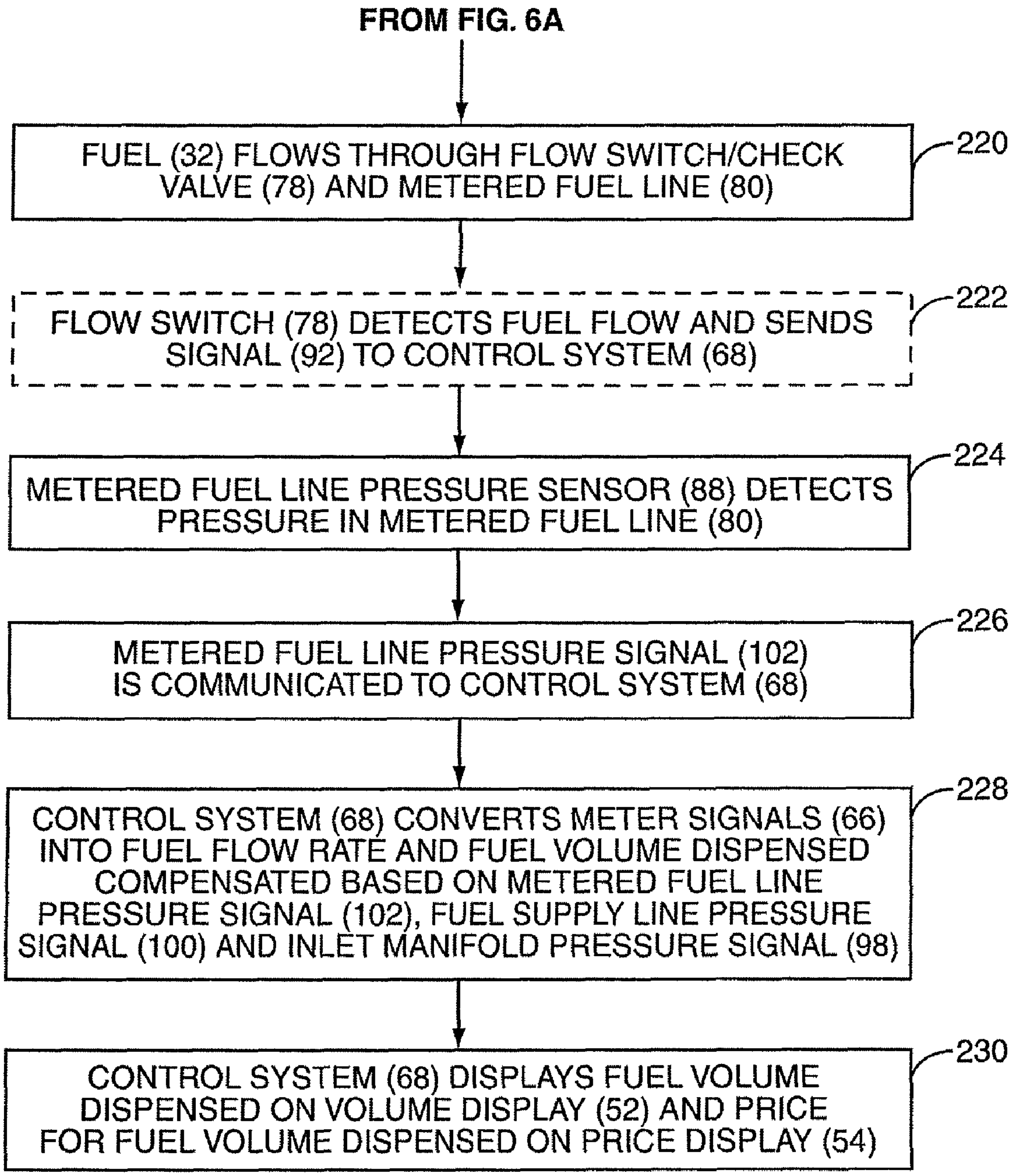

FIGS. 6A and 6B illustrate a flow chart that describes the operation of the present invention where the control system 68 uses the pressure signals 98, 100 and 102 from the pressure sensors 84, 86 and 88 to compensate for the nozzle snap and accurately determine the volume of fuel flowing through the meter 28. The process starts (block 200), and the customer initiates a fueling transaction at a fuel dispenser 28 (block 202). In some embodiments, the inlet manifold pressure sensor 84 is present and detects the pressure in the inlet manifold 72 (block 204) and communicates the inlet manifold pressure signal 98 to the control system 68 (block 206). The control system 68 sends a message to the flow control valve 74 to open (block 208). The flow control valve 74 opens and fuel flows through the flow control valve 74 (block 210).

In some embodiments of the present invention, the fuel supply line pressure sensor 86 is present and detects the pressure in the fuel supply line 76 as the fuel flows from the flow control valve 74 (block 212). The fuel supply line pressure sensor 86 communicates the fuel supply line pressure signal 100 to the control system 68 (block 214). Fuel 32 flows through the fuel supply line 76 to and through the meter 28 (block 216). As the fuel 32 is flowing through the meter 28, the fuel 32 rotates the turbine rotors 58, 60 thereby generating meter signals 66. The meter signals 66 are communicated to the control system 68 (block 218). Fuel 32 flows from the meter 28 through the flow switch/check valve 78 and the metered fuel line 80 (block 220). If a flow switch 78 is present, the flow switch 78 detects the flow of fuel 32 and sends the signal 92 to the control system 68 (block 222). It is not necessary that a flow switch 78 be included as the pressure sensors 84, 86, 88 can provide sufficient indication to the control system 68 of flow of fuel 32. The metered fuel line pressure sensor 88 detects pressure in the metered fuel line 80

(block 224) and communicates the metered fuel line pressure signal 102 to the control system 68 (block 226).

The control system 68 converts the meter signals 66 into fuel flow rate and fuel volume. The control system 68 compensates the fuel flow rate and fuel volume based on the metered fuel line pressure signal 102 and, in some embodiments, the fuel supply line pressure signal 100 and the inlet manifold pressure signal 98 (block 228). The control system 68 then displays the fuel volume dispensed on the volume display 52 and the price for the fuel 32 dispensed on the price display 54 (block 230).

Figure 7:
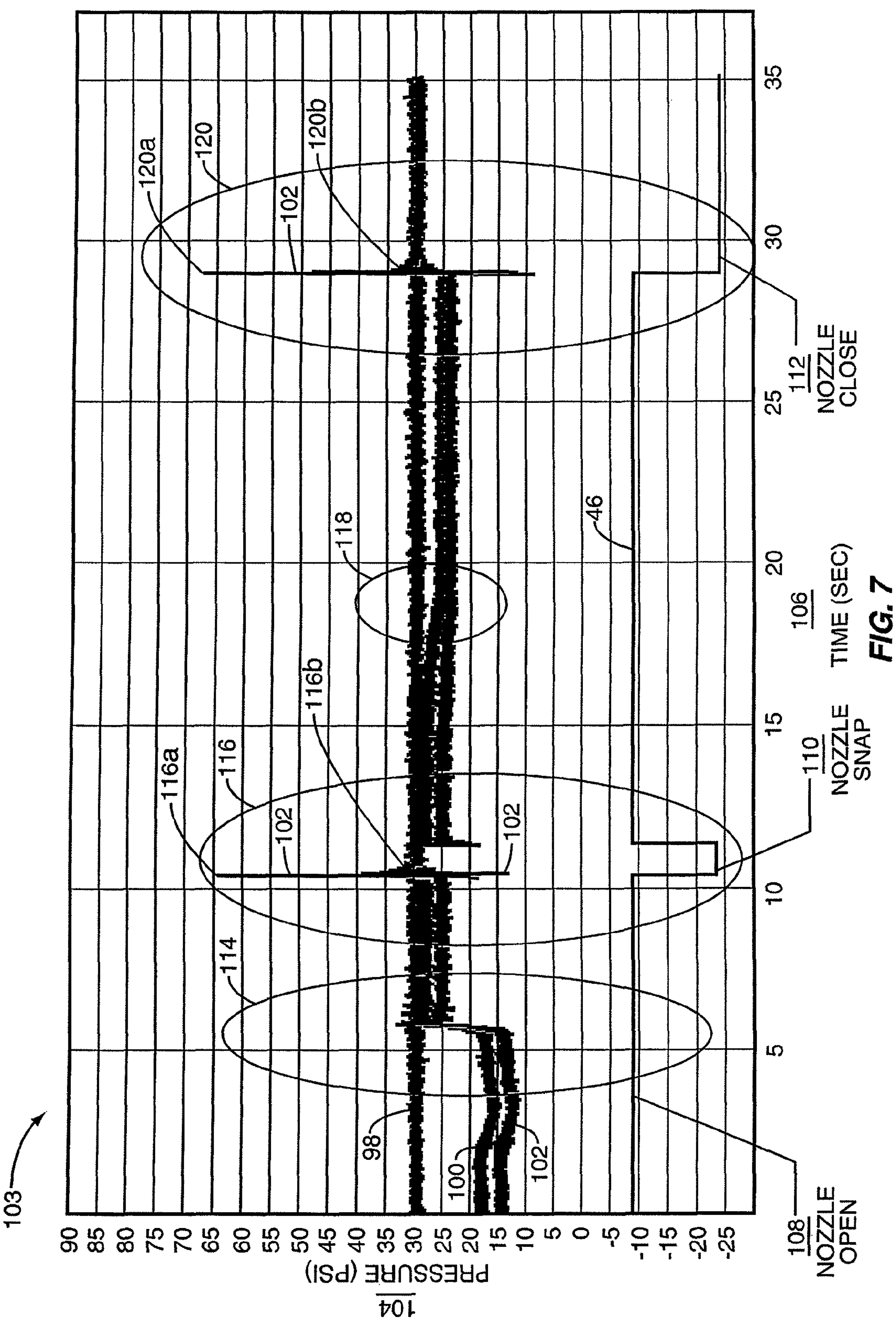
FIG. 7 illustrates a graphic plot of pressure in the inlet manifold, fuel supply line and metered fuel line of a fuel dispenser in response to nozzle actions including a nozzle snap.

FIG. 7 illustrates a graphic plot 103 of pressure in pounds per square inch (PSI) 104 over time in seconds 106 of the inlet manifold pressure signal 98, the fuel supply line pressure signal 100 and the metered fuel line pressure signal 102 of the fuel dispenser 26 in response to nozzle 46 actions at the fuel dispenser 26. The graphic plot 103 illustrates the nozzle 46 as open 108 until just after 10 seconds when the customer at the fuel dispenser 26 performs a nozzle snap 110, also referred to as a local nozzle snap, and illustrates the nozzle 46 as closed at a time just prior to 30 seconds when the customer completes the fueling.

The graphic plot 103 of FIG. 7 illustrates the inlet manifold pressure signal 98 as relatively constant reflecting the pressure within the fueling environment 10 from the underground storage tanks 30. The fuel supply line pressure signal 100 and the metered fuel line pressure signal 102 reach a level 114 indicating that the fuel 32 is flowing normally through the fuel dispenser 26 and the fueling transaction is proceeding. The differential between the inlet manifold pressure signal 98 of approximately 30 PSI and the metered fuel line pressure signal 102 of approximately 25 PSI indicates that fuel 32 is flowing normally from the inlet manifold 72 through the meter 28.

At the time of the nozzle snap 110, a pressure spike 116 occurs. The metered fuel line pressure signal 102 rapidly increases to approximately 65 PSI or 2.5 times the normal fuel flow pressure of 25 PSI 116*a* and rapidly decreases to approximately 12 PSI or 0.5 times the normal fuel flow pressure of 25 PSI 116*b*. The rapid increase and decrease in the metered fuel line pressure signal 102 indicates the flow disturbance in the metered fuel line as a result of the nozzle snap 110.

As shown in FIG. 7, the metered fuel line pressure signal 102 begins to settle back to a normal level 116*b* and reaches that level in approximately 1.0 second from the initiation of the nozzle snap 110. The fuel supply line pressure signal 100 also settles into a normal level 118.

When the nozzle 46 is closed 112, another pressure spike occurs 120. The metered fuel line pressure signal 102 rapidly increases to approximately 65 PSI 120*a* but quickly settles back to 30 PSI 120*b*, or the same pressure as the inlet manifold pressure signal 98. Because there is no differential between the inlet manifold pressure signal 98 and the metered fuel line pressure signal 102, there is no flow of fuel 32, which is indicative of the nozzle 46 being closed 112.

Figure 8:
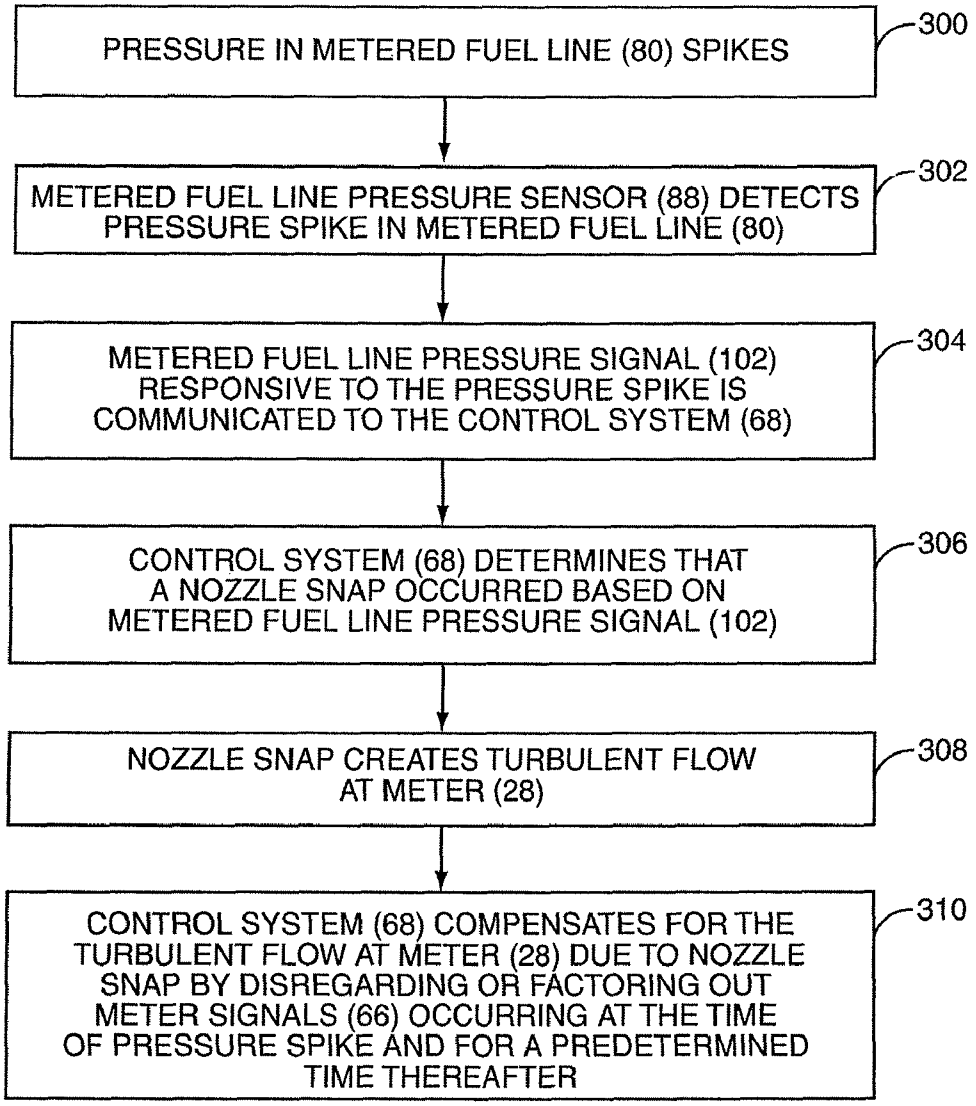
FIG. 8 illustrates a flowchart diagram of the operation of a control system of a fuel dispenser to compensate the fuel flow rate and fuel volume dispensed based on a nozzle snap.

FIG. 8 illustrates a flowchart diagram of the operation of the control system 68 of the fuel dispenser 26 to compensate the fuel flow rate and fuel volume dispensed based on a local nozzle snap at the fuel dispenser 26. The process starts when the pressure in the metered fuel line 80 spikes (block 300). The metered fuel line pressure sensor 88 detects the pressure spike in the metered fuel line 80 (block 302) and communicates a metered fuel line pressure signal 102 responsive to the pressure spike to the control system 68 (block 304).

The control system 68 determines that a nozzle snap occurred at the fuel dispenser 26 based on the metered fuel line pressure signal 102 (block 306). The pressure spike due to the nozzle snap creates the flow disturbance at the meter 28 (block 308). The control system compensates for the flow disturbance at the meter 26 by factoring out meter signals 66 occurring at the time of the pressure spike and for a predetermined time thereafter (block 310). The control system 68 may factor out the meter signals 66 by simply disregarding the meter signals 66 for that predetermined time and therefore not converting the disregarded meter signals 66 into fuel volume dispensed. Once the predetermined period of time has expired, the control system 68 may resume converting the meter signals 66 into fuel volume dispensed. Alternatively, the control system 68 may apply a mathematical factor to the conversion process to take the flow disturbance into account.

Figure 9:
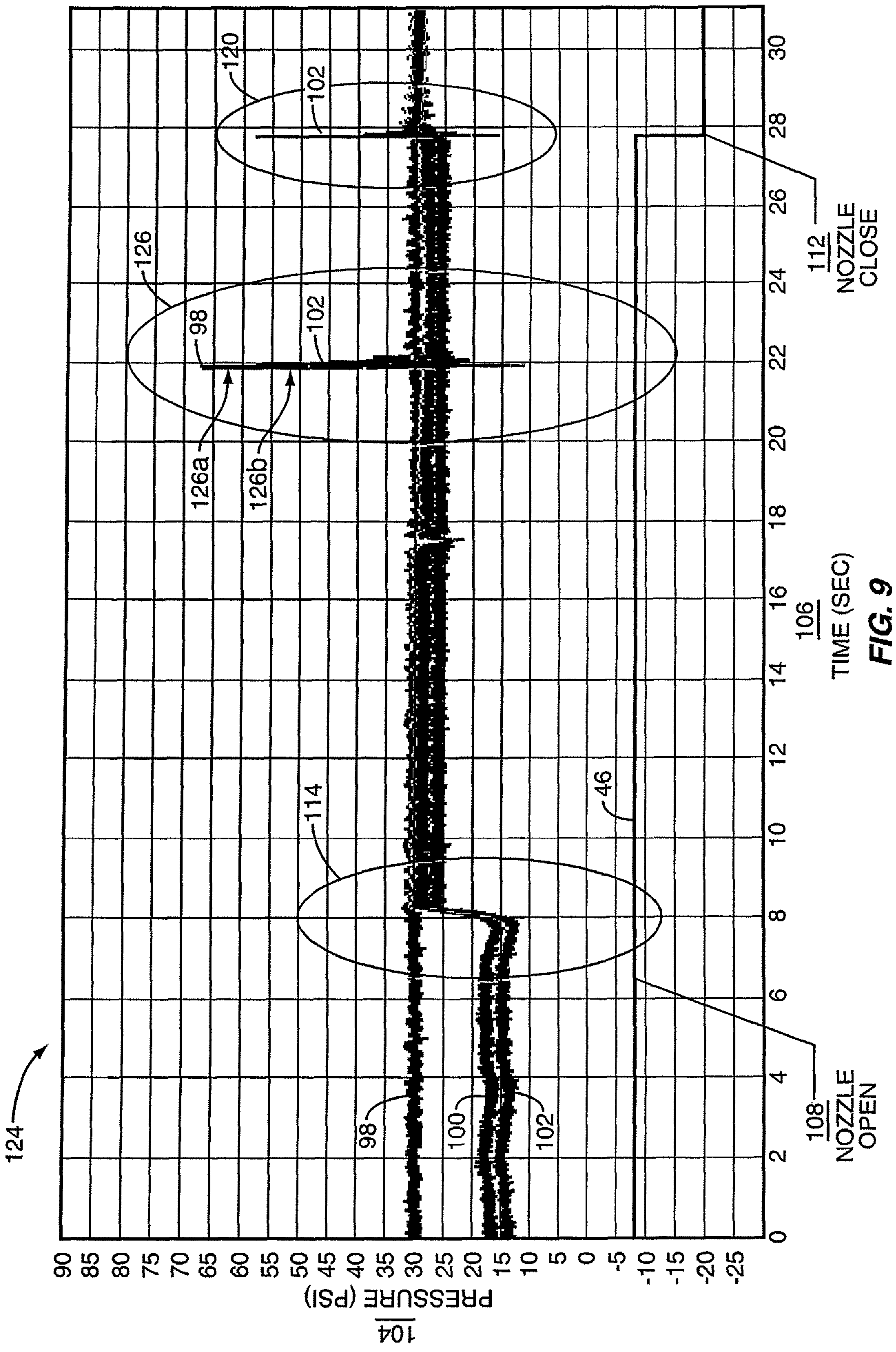
FIG. 9 illustrates a graphic plot of pressure in the inlet manifold, fuel supply line and metered fuel line of a fuel dispenser in response to nozzle actions including a remote nozzle snap.

FIG. 9 illustrates another graphic plot 124 of pressure in pounds per square inch (PSI) 104 over time in seconds 106 of the inlet manifold pressure signal 98, the fuel supply line pressure signal 100 and the metered fuel line pressure signal 102 of the fuel dispenser 26. In FIG. 9, as in FIG. 7, the inlet manifold pressure signal 98 is at approximately 30 PSI, and the fuel supply line pressure signal 100 and metered fuel line pressure signal 102 reach a level indicating normal fuel flow at approximately 25 PSI 114. Also, as in FIG. 7, the metered fuel line pressure signal 102 shows a rapid increase 120 at the time of nozzle close 112.

However, unlike the graphic plot 103 in FIG. 7, FIG. 9 shows both the inlet manifold pressure signal 98 and the metered fuel line pressure signal 102 indicating a pressure spike 126. The inlet manifold pressure signal 98 rapidly increases to approximately 66 PSI 126*a* while the metered fuel line pressure signal 102 rapidly increases to approximately 50 PSI 126*b*. Both the inlet manifold pressure signal 98 and the metered fuel line pressure signal 102 return to normal fuel flow pressure level in approximately 0.25 seconds 126*c*. The pressure spike 126 happens without any activity occurring at the nozzle 46. Accordingly, the pressure spike 126 was caused by a pressure disturbance due to a non-steady state condition occurring at some point in the fueling environment 10 other than by the action of the customer at the fuel dispenser 26. The pressure spike 126 was caused by a nozzle snap at another fuel dispenser, also referred to as a remote nozzle snap.

When the fueling is complete and the nozzle 46 closed 112, the metered fuel line pressure signal 102 reacts in a similar fashion as in FIG. 7. The metered fuel line pressure signal 102 rapidly increases but quickly settles back to the same pressure as the inlet manifold pressure signal 98. Because there is no differential between the inlet manifold pressure signal 98 and the metered fuel line pressure signal 102, there is no flow of fuel 32, which is indicative of the nozzle 46 being closed.

Figure 10:
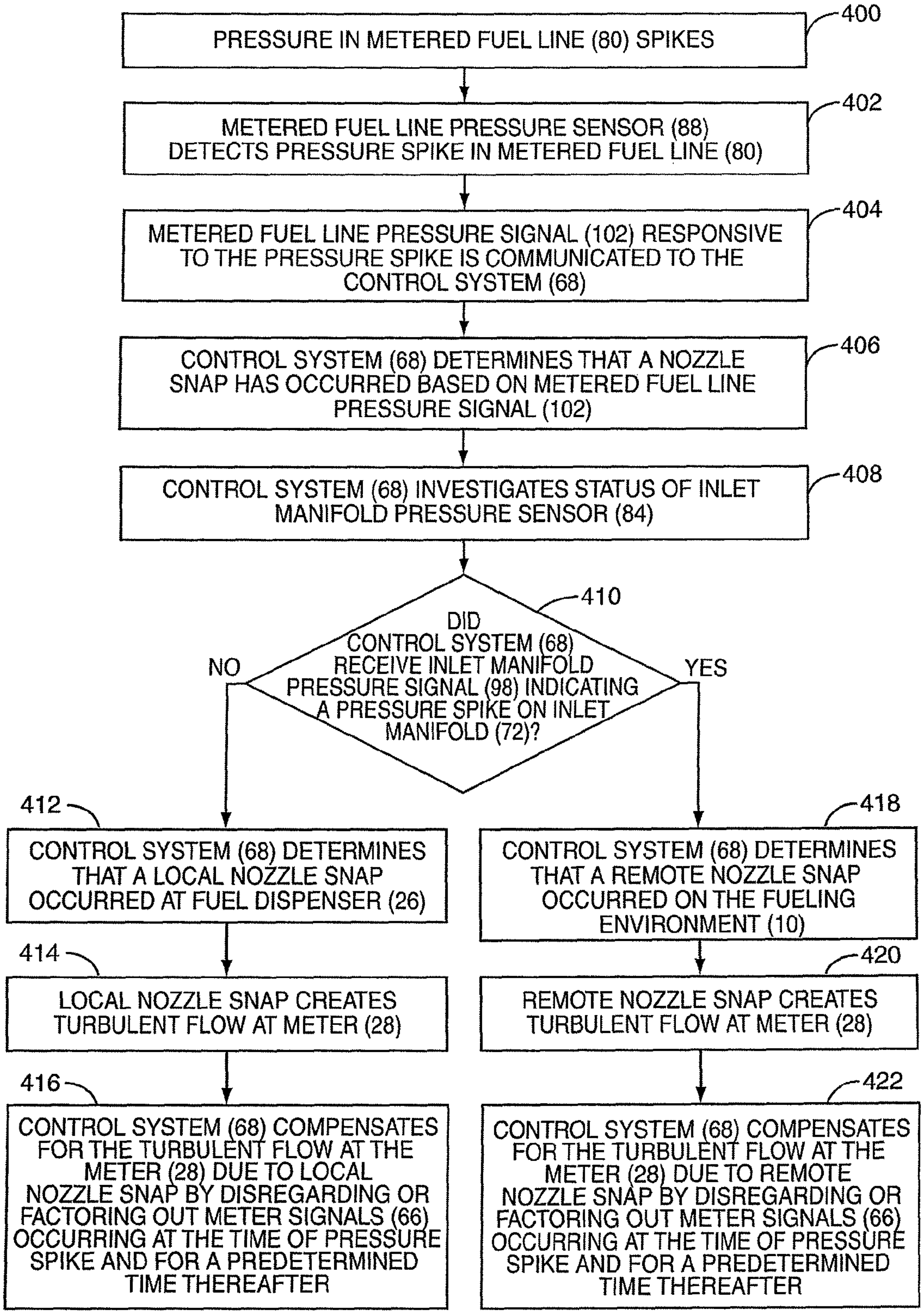
FIG. 10 illustrates a flowchart diagram of the operation of a control system of a fuel dispenser to compensate the fuel flow rate and fuel volume dispensed based on a local and a remote nozzle snap.

FIG. 10 illustrates a flowchart diagram of the operation of the control system 68 of the fuel dispenser 26 to compensate the fuel flow rate and fuel volume dispensed based on a local nozzle snap at the fuel dispenser 26 and a remote nozzle snap at some other location in the fueling environment 10. The process starts when the pressure in the metered fuel line 80 spikes (block 400). The metered fuel line pressure sensor 88 detects the pressure spike in the metered fuel line 80 (block 402) and communicates a metered fuel line pressure signal 102 responsive to the pressure spike to the control system 68 (block 404).

The control system 68 determines that a nozzle snap occurred somewhere in the fueling environment 10 based on the metered fuel line pressure signal 102 (block 406). The control system 68 investigates the status of the inlet manifold pressure sensor 84 (block 408). The control system 68 determines whether it received an inlet manifold pressure signal 98 indicting a pressure spike on the inlet manifold 72 (block 410).

If the control system 68 determines that it did not receive an inlet manifold pressure signal 98 indicative of a pressure spike in the inlet manifold 72, the control system 68 determines that a local nozzle snap occurred at the fuel dispenser 26 (block 412), which created a flow disturbance at the meter 28 (block 414). The control system 68 compensates for the flow disturbance at the meter 28 due to the local nozzle snap by factoring out the meter signals 66 occurring at the time of the pressure spike and for a predetermined time thereafter (block 416).

If the control system determines that it did receive an inlet manifold pressure signal 98 indicative of a pressure spike in the inlet manifold 72, the control system 68 determines that a remote nozzle snap occurred somewhere in the fueling environment 10 (block 418) which created a flow disturbance at the meter 28 (block 420). The control system 68 compensates for the flow disturbance at the meter 28 due to the remote nozzle snap by factoring out the meter signals 66 occurring at the time of the pressure spike and for a predetermined time thereafter (block 422).

The predetermined time for factoring out the meter signals 66 due to a local nozzle snap may not be the same as the predetermined time for factoring out the meter signals 66 due to a remote nozzle snap, and, preferably, may be different. The control system 68 may factor out the meter signals 66 by simply disregarding the meter signals 66 for that predetermined time and therefore not converting the disregarded meter signals 66 into fuel volume dispensed. Once the predetermined period of time has expired, the control system 68 may resume converting meter signals 66 into fuel volume dispensed. Alternatively, the control system may apply a mathematical factor to the conversion process to take the flow disturbance into account. The mathematical factor used to compensate for a local nozzle snap may not be the same as the mathematical factor used to compensate for a remote nozzle snap.

Figure 11:
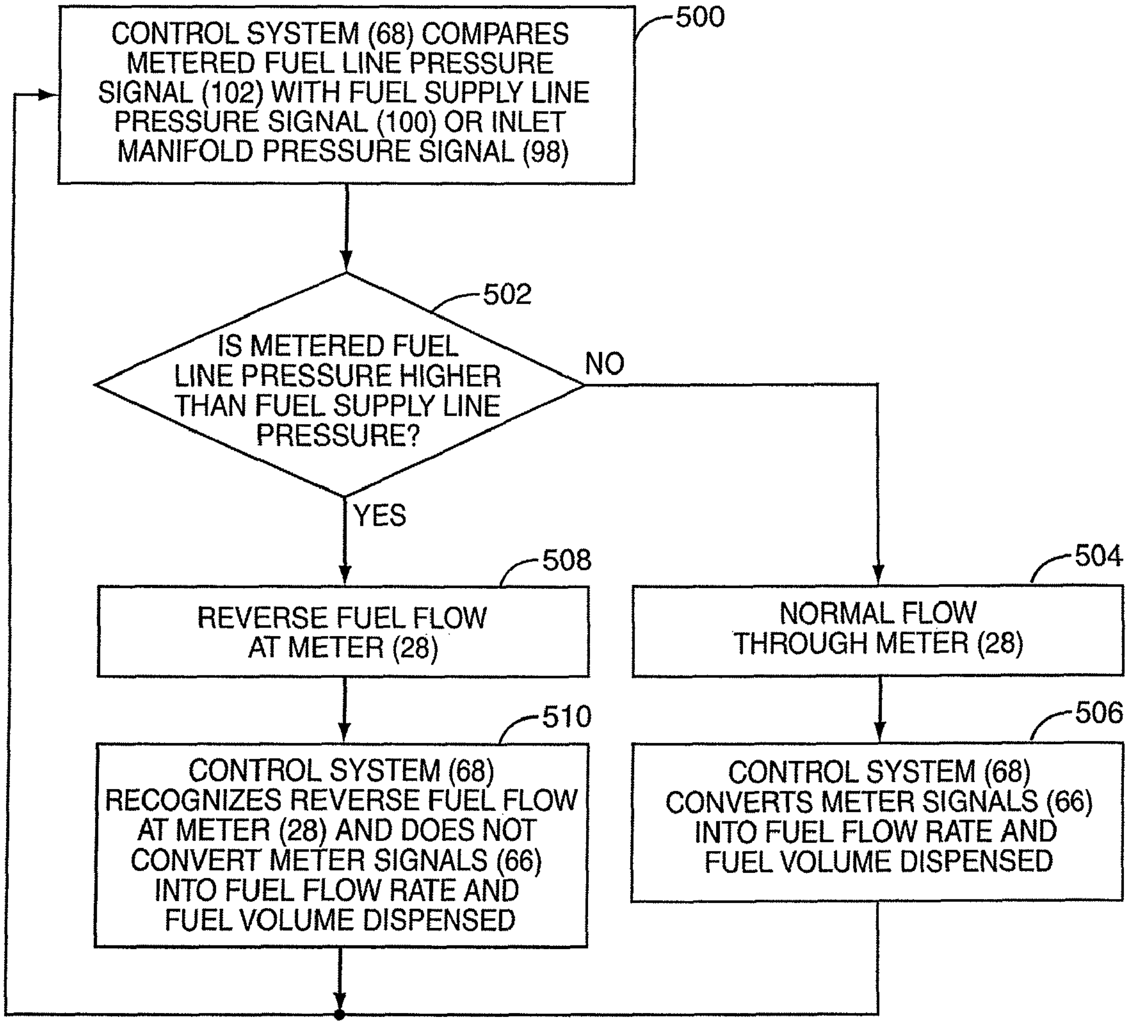
FIG. 11 illustrates a flowchart diagram of the operation of a control system of a fuel dispenser to determine the proper flow of fuel through a meter by comparing a metered fuel line pressure with a fuel supply line pressure.

FIG. 11 illustrates a flowchart diagram of the operation of the control system 68 of the fuel dispenser 26 to determine the proper flow of fuel 32 through the meter 28 by comparing the metered fuel line pressure with the fuel supply line pressure. The process begins by control system 68 comparing the metered fuel line pressure signal 102 with the fuel supply line pressure signal 100 and the inlet manifold pressure signal 98 (block 500).

The control system 68 determines whether the metered fuel line pressure signal 102 is higher than either the fuel supply line pressure signal 100 or the inlet manifold pressure signal 98 (block 502). If the control system 68 determines that the metered fuel line pressure signal 102 is not higher than the fuel supply line pressure signal 100, then fuel 32 is flowing normally through the meter 28 (block 504) and the control system 68 continues to convert the meter signals 66 into fuel flow rate and volume dispensed (block 506).

If the control system 68 determines that metered fuel line pressure signal 102 is higher than the fuel supply line pressure signal 100, then fuel 32 is flowing in the reverse direction (block 508). The control system 68 recognizes the reverse fuel flow and does not convert any meter signals 66 into fuel flow rate and fuel volume dispensed (block 510). The process operates in a continuous loop with the control system 68 comparing the metered fuel line pressure signal 102 with the fuel supply line pressure signal 100 and the inlet manifold pressure signal 98 (block 500).

Although the use of pressure sensors in determining and compensating for the existence of non-steady state conditions in a fueling environment is described, one of ordinary skill in the art will understand and appreciate that pressure sensors may be used to determine fuel flow and enhance meter operation in steady state conditions also. Moreover, the pressure sensors may be used instead of a flow switch. In particular, not only can the level of pressure detected by a pressure sensor be used to determine fuel flow, but the differential in pressure from a pressure sensor located downstream from the pressure detected by a pressure sensor located upstream may be used to determine and enhance the accuracy of fuel flow rate and fuel volume dispensed.

Those skilled in the art will recognize improvements and modifications to the preferred embodiments of the present invention. All such improvements and modifications are considered within the scope of the concepts disclosed herein and the claims that follow.

What is claimed is:

1. A fuel dispenser for dispensing fuel from at least one storage tank to a vehicle, the dispenser comprising:

a control system;

a fuel flow path configured to receive fuel from the at least one fuel storage tank for dispensing to the vehicle;

a meter operatively coupled inline to the fuel flow path and through which fuel passes, wherein the meter is operatively connected to the control system and adapted to transmit a meter signal to the control system in relation to the amount of fuel passing through the meter; and a first pressure sensor operatively coupled to the fuel flow path and configured to sense pressure in the fuel flow path, wherein the first pressure sensor is operatively connected to the control system and adapted to transmit a first signal representative of the pressure sensed by the first pressure sensor, wherein the control system is adapted to:

calculate a volume or flow rate of the fuel delivered to the vehicle based on the meter signal;

determine if a non-steady state condition exists in the fuel flow path during fueling based at least in part on data corresponding to the first signal; and compensate the calculated volume or flow rate of the fuel in response to the determination of the non-steady state condition.

2. The fuel dispenser of claim 1, wherein the control system is further adapted to compensate the calculated volume or flow rate of the fuel in response to determination of the non-steady state condition by disregarding the meter signal for a predetermined period of time.

3. The fuel dispenser of claim 2, wherein the control system is further adapted to resume calculating a volume or flow rate of the fuel delivered to the vehicle based on the meter signal after expiration of the predetermined period of time.

4. The fuel dispenser of claim 1, wherein the control system is further adapted to compensate the calculated volume or flow rate of the fuel in response to determination of the non-steady state condition by applying a mathematical factor to the calculated volume or flow rate of the fuel.

5. The fuel dispenser of claim 1, wherein the determination of the non-steady state condition is based on a detection of a pressure spike in the fuel flow path.

6. The fuel dispenser of claim 1, wherein the determination of the non-steady state condition is due to a nozzle snap.

7. The fuel dispenser of claim 6, wherein the nozzle snap is a local nozzle snap.

8. The fuel dispenser of claim 6, wherein the nozzle snap is a remote nozzle snap.

9. The fuel dispenser of claim 1, wherein the first pressure sensor is positioned to sense the pressure in the fuel flow path downstream from the meter.

10. The fuel dispenser of claim 1, wherein the pressure sensor is positioned to sense the pressure in the fuel flow path upstream from the meter.

11. The fuel dispenser of claim 9 further comprising a second pressure sensor operatively coupled to the fuel flow path and configured to sense pressure in the fuel flow path upstream from the meter, wherein the second pressure sensor is operatively connected to the control system and adapted to transmit a second signal representative of the pressure sensed by the second pressure sensor, wherein the control system is further adapted to determine if a non-steady state condition exists in the fuel flow path based at least in part on data corresponding to the second signal.

12. The fuel dispenser of claim 11, wherein the second pressure sensor is operatively coupled to a fuel supply line.

13. The fuel dispenser of claim 11, wherein the second pressure sensor is operatively coupled to an inlet manifold.

14. The fuel dispenser of claim 11 further comprising a third pressure sensor operatively coupled to the fuel flow path and configured to sense pressure in the fuel flow path upstream from the meter, wherein the third pressure sensor is operatively connected to the control system and adapted to transmit a third signal representative of the pressure sensed by the third pressure sensor, wherein the control system is further adapted to determine if a non-steady state condition exists in the fuel flow path based at least in part on data corresponding to the third signal.

15. The fuel dispenser of claim 14 wherein the second pressure sensor is operatively coupled to an inlet manifold, and the third pressure sensor is operatively coupled to a fuel supply line.

16. The fuel dispenser of claim 11, wherein the control system is further adapted to determine if a non-steady state condition exists in the fuel flow path based on the first and second signals.

17. The fuel dispenser of claim 14, wherein the control system is further adapted to determine if a non-steady state condition exists in the fuel flow path based on data corresponding to at least one of the first, second, and third signals.

18. A fuel dispenser for dispensing fuel from at least one storage tank to a vehicle, the dispenser comprising:

a control system;

a fuel flow path configured to receive fuel from the at least one fuel storage tank for dispensing to the vehicle;

a meter operatively coupled inline to the fuel flow path and through which fuel passes, wherein the meter is operatively connected to the control system and adapted to transmit a meter signal to the control system in relation to the amount of fuel passing through the meter;

a first pressure sensor operatively coupled to the fuel flow path and configured to sense pressure in the fuel flow path upstream from the meter, wherein the first pressure sensor is operatively connected to the control system and adapted to transmit a first signal representative of the pressure sensed by the first pressure sensor; and a second pressure sensor operatively coupled to the fuel flow path and configured to sense pressure in the fuel flow path downstream from the meter, wherein the second pressure sensor is operatively connected to the control system and adapted to transmit a second signal representative of the pressure sensed by the first pressure sensor, wherein the control system is adapted to:

calculate a volume or flow rate of the fuel delivered to the vehicle based on the meter signal;

determine if a non-steady state condition exists in the fuel flow path during fueling based on data corresponding to at least one of the first and second signals; and compensate the calculated volume or flow rate of the fuel in response to the determination of the non-steady state condition.

19. The fuel dispenser of claim 18, wherein the control system is further adapted to determine a direction of fuel flow in the fuel flow path based on a comparison of the first and second signals and to compensate the calculated volume or flow rate of the fuel in response to the comparison of the first and second signals.

20. The fuel dispenser of claim 19, wherein the control system is further adapted to compensate the calculated volume or flow rate of the fuel for a first period of time when the pressure sensed by the second pressure sensor is not less than the pressure sensed by the first pressure sensor.

21. The fuel dispenser of claim 20, wherein the control system is further adapted to compensate the calculated volume or flow rate of the fuel by disregarding the meter signal for the first period of time.

22. The fuel dispenser of claim 21, wherein the control system is further adapted to compensate the calculated volume or flow rate of the fuel by disregarding the meter signal for a second period of time, wherein the second period of time is comparable to the first period of time.

23. A method for dispensing fuel received from at least one fuel storage tank to a vehicle, the method comprising the steps of:

receiving from a meter a meter signal in relation to the amount of fuel passing through the meter;

calculating a volume or flow rate of the fuel dispensed to the vehicle based on the meter signal;

detecting a non-steady state condition in a fuel flow path from the at least one storage tank to the vehicle during fueling based on data corresponding to a first signal transmitted by a first pressure sensor operatively coupled to the fuel flow path; and compensating the calculated volume or flow rate of the fuel in response to detection of the non-steady state condition.

24. The method of claim 23, wherein the first pressure sensor senses pressure downstream from the meter and the step of detecting a non-steady state condition further comprises detecting the non-steady state condition in the fuel flow path based on data corresponding to a second signal transmitted by a second pressure sensor that senses pressure upstream from the meter.

25. The method of claim 24, wherein the step of detecting the non-steady state condition comprises detecting a reverse flow of fuel in the fuel flow path.

26. The method of claim 24, wherein the step of detecting the non-steady state condition comprises detecting a local nozzle snap.

27. The method of claim 24, wherein the step of detecting the non-steady state condition comprises detecting a remote nozzle snap.

28. The method of claim 24, wherein the second pressure sensor senses pressure in the fuel flow path downstream of a flow control valve.

29. The method of claim 24, wherein the second pressure sensor senses pressure in the fuel flow path upstream of a flow control valve.

30. The method of claim 28, wherein the step of detecting the non-steady state condition comprises detecting the non-steady state condition in the fuel flow path based on data corresponding to a third signal transmitted by a third pressure sensor that senses pressure in the fuel flow path upstream from the flow control valve.

31. The method of claim 29, wherein the step of detecting the non-steady state condition comprises detecting the non-steady state condition in the fuel flow path based on data corresponding to a third signal transmitted by a third pressure sensor that senses pressure in the fuel flow path downstream from the flow control valve and upstream from the meter.

* * * * *